(12) United States Patent
Kulikovsky (10) Patent No.: US 11,024,862 B2
(45) Date of Patent: Jun. 1, 2021

(54) FUEL CELL ARRANGEMENT

(71) Applicant: Forschungszentrum Juelich GmbH, Juelich (DE)

(72) Inventor: Andrei Kulikovsky, Estonia (EE)

(73) Assignee: Forschungszentrum Juelich GmbH

( * ) Notice: Subject to any disclaimer, the term of this patent is extended or adjusted under 35 U.S.C. 154(b) by 0 days.

(21) Appl. No.: 16/747,669

(22) Filed: Jan. 21, 2020

(65) Prior Publication Data

US 2020/0153009 A1     May 14, 2020

Related U.S. Application Data (62) Division of application No. 15/560,638, filed as application No. PCT/DE2016/000062 on Feb. 18, 2016, now Pat. No. 10,637,083.

(30) Foreign Application Priority Data

Apr. 23, 2015 (DE) .................... 10 2015 005 220.9

(51) Int. Cl.
    *H01M 8/04537*     (2016.01)
    *H01M 8/1006*     (2016.01)
    (Continued)

(52) U.S. Cl.
    CPC ........... *H01M 8/04544* (2013.01); *C25B 1/02* (2013.01); *C25B 11/00* (2013.01);
    (Continued)

(58) Field of Classification Search
    CPC ................................................. H01M 8/04544
    See application file for complete search history.

(56) References Cited

U.S. PATENT DOCUMENTS

2003/0113608 A1 * 6/2003 Hong .................. H01M 8/0228
                                                   429/434

FOREIGN PATENT DOCUMENTS

DE        102015001572 A1     8/2016
JP          2006351404 A * 12/2006 .............. H01M 8/04
                  (Continued)

OTHER PUBLICATIONS

TranslationJP2006351404A (Year: 2020).*
                  (Continued)

*Primary Examiner* — Brian R Ohara
(74) *Attorney, Agent, or Firm* — Jordan and Koda, PLLC (57) ABSTRACT

A fuel cell arrangement for carrying out a method for ascertaining the overvoltage of a working electrode in a fuel cell, in which the potential of a reference electrode compared to the grounded counter electrode is measured. For the measurement, a fuel cell comprising a polymer electrolyte membrane is used, in which the counter electrode comprises a lateral edge having at least one convexly curved region, and the electrolyte membrane surface, adjoining the counter electrode, comprises an electrode-free region in which the reference electrode is disposed on the electrolyte membrane surface. In contrast, the working electrode is continuous, which is to say has a large surface. The minimum distance $L_{gap}$ between the reference electrode and the edge of the counter electrode $L_{gap}=3 \times L_{l,r}$ with (a) and (b), where m=ionic conductivity of the electrolyte membrane ($\Omega^{-1}$ cm$^{-1}$), $b_{ox}$=Tafel slope of the half cell for the electrochemical reaction of the working electrode, $l_m$=membrane layer thickness (cm) and $j_{ox}^0$=exchange current density of the catalyst of the working electrode per unit of electrode surface in (A cm$^{-2}$). This arrangement can advantageously be used to ensure that the potential measured at the hydrogen-fed reference electrode corresponds to the overvoltage (Continued)

Membrane (Cathode)

of the working electrode with sufficient accuracy. The method can be applied to polymer electrolyte membrane fuel cells (PEMFC), to direct methanol fuel cells (DMFC) or to high-temperature fuel cells (SOFC).

8 Claims, 9 Drawing Sheets

(51) Int. Cl.
    *H01M 8/1011*    (2016.01)
    *H01M 8/1018*    (2016.01)
    *H01M 8/12*       (2016.01)
    *H01M 8/124*     (2016.01)
    *C25B 1/02*      (2006.01)
    *C25B 11/00*     (2021.01)

(52) U.S. Cl.
    CPC ..... *H01M 8/04552* (2013.01); *H01M 8/1006* (2013.01); *H01M 8/1011* (2013.01); *H01M 8/1018* (2013.01); *H01M 8/12* (2013.01); *H01M 2008/1095* (2013.01); *H01M 2008/1293* (2013.01); *Y02E 60/50* (2013.01)

(56) References Cited

FOREIGN PATENT DOCUMENTS

JP      2006351404 A    12/2006
WO    2007/110970 A1   10/2007

OTHER PUBLICATIONS

English machine translation of Chiba et al. (JP 2006351404 A) (2006).
A. A Kulikovsky: "Potentials Near a Curved Anode Edge in a PEM Fuel Cell: Analytical Solution for Placing a Reference Electrode", Journal of the Electrochemical Society, vol. 162, No. 10, Jul. 29, 2015 (Jul. 29, 2015), pp. F1191-F1198, XP055273163, ISSN: 0013-4651, DOI: 10.1149/2.0331510jes.
S. B. Adler et al., J. Electrochem. Soc., vol. 149, 2002, pp. E166.
Dietmar Gerteisen: "Realising a reference electrode in a polymer electrolyte fuel cell by laser ablation", Journal of Applied Electrochemistry, Kluwer Academic Publishers, DO, vol. 37, No. 12, Jul. 3, 2007 (Jul. 3, 2007), pp. 1447-1454, XP019552392, ISSN: 1572-8838, DOI: 10.1007/S10800-007-9352-Y.
Jan Hendrik Ohs et al: "The Effect of the Reference Electrode Position on the Measurement of Half Cell Polarization in Proton-Exchange Membrane Fuel Cells", Journal of the Electrochemical Society, vol. 159, No. 7, Jul. 17, 2012 (Jul. 17, 2012), pp. 181-186, XP055273111, DOI: 10.1149/2.006207jes].
Liu Z et al: "Positioning the reference electrode in proton exchange membrane fuel cells: calculations of primary and secondary current distribution", Electrochimica Acta, Elsevier Science Publishers, Barking, GB, vol. 49, No. 6, Mar. 1, 2004 (Mar. 1, 2004), pp. 923-935, XP004485848, ISSN: 0013-4686, DOI: 10.1016/J.ELECTACTA.2003.10.004.
Masahiro Watanabe et al: "Management of the Water Content in Polymer Electrolyte Membranes With Porous Fiber Wicks", Journal of the Electrochemical Society, Electrochemical Society, vol. 140, No. 11, Nov. 1, 1993 (Nov. 1, 1993), pp. 3190-3193, XP000424491, ISSN: 0013-4651.
Offer G J et al: "Using electrochemical impedance spectroscopy to compensate for errors when measuring polarisation curves during three-electrode measurements of solid oxide fuel cell electrodes", Electrochimica Acta, Elsevier Science Publishers, Barking, GB, vol. 53, No. 26, Apr. 8, 2008 (Apr. 8, 2008), pp. 7614-7621, XP023907519, ISSN: 0013-4686, [retrieved on Apr. 8, 2008], DOI: 10.1016/J.ELECTACTA.2008.04.001.
Yuan et al: "AC impedance technique in PEM fuel cell diagnosis—A review", International Journal of Hydrogen Energy, Elsevier Science Publishers B.V., Barking, GB, vol. 32, No. 17, Nov. 29, 2007 (Nov. 29, 2007), pp. 4365-4380, XP022369437, ISSN: 0360-3199, DOI: 10.1016/J.IJHYDENE.2007.05.036.
Boukamp et al: Influence of electrode geometry and NLLS fit analysis of 1-V measurements in a three-electrode cell. In: Solid State Ionics, 28-30, 1988, 1187-1191.
Nagata et al. : Dependence of observed overvoltages on the positioning of the reference electrode on the solid electrolyte. In: Solid State Ionics, 67, 1994, 215-224.
Hashibon et al. : Preferred position for the reference electrode in solid state electrochemistry. In: Solid State Ionics, 149, 2002, 167-176.

\* cited by examiner

FIG. 1

(Prior Art)

FIG. 2

(Prior Art)

FIG. 3

(Prior Art)

FUEL CELL ARRANGEMENT

The invention relates to a novel fuel cell design, in particular for a polymer electrolyte membrane fuel cell (PEMFC), for ascertaining overvoltages.

BACKGROUND OF THE INVENTION

In an electrochemical cell, the electrochemical reactions at the involved electrodes are decisively influenced by the half-cell overvoltages. These overvoltages include both contributions from the activation and from transport losses of the corresponding half cells. It is therefore considered to be a primary objective to minimize these contributions within the scope of a novel cell concept. One of the most common previous methods for measuring half-cell overvoltages is a method using a reference electrode (RE).

A reference electrode is always aimed at measuring the potential $\Phi$ of the electrolyte membrane at an arbitrary point between two electrodes. Having knowledge of this potential makes it possible, in principle, to separate the cathode overvoltage and the anode overvoltage. However, it has been found that suitable positioning of the reference electrode is not readily apparent.

Figure 1:
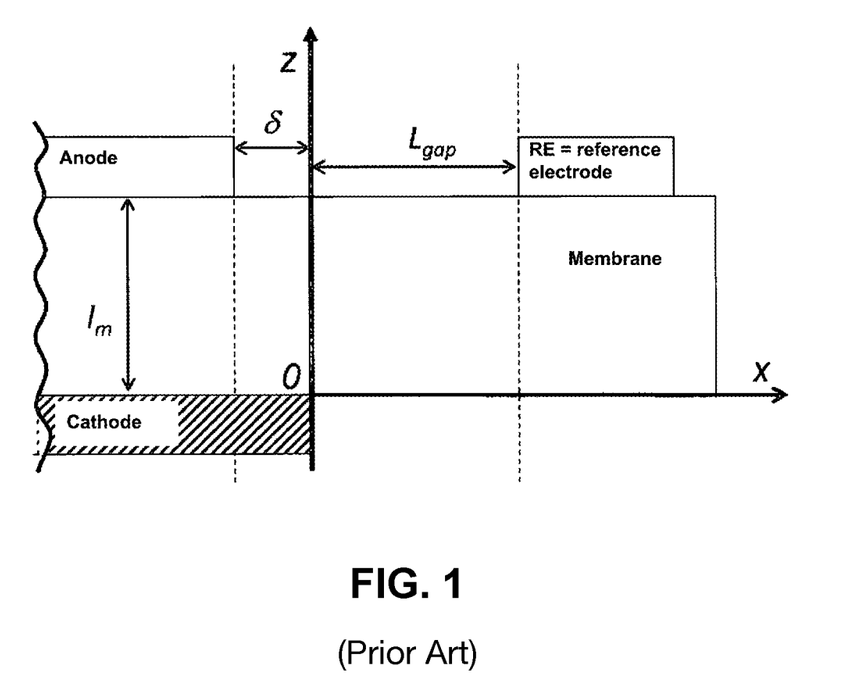
FIG. 1 shows an exemplary schematic fuel cell arrangement comprising a reference electrode (from the prior art)

A typical option for positioning a reference electrode within an electrochemical cell is to dispose the reference electrode on one cell side, at a certain distance $L_{gap}$ from the edges of the working electrode, which are aligned with one another. For this purpose, a design according to FIG. 1 is proposed, in which the two electrodes or the lateral edges thereof are aligned with one another.

Within the scope of simulations, B. Adler et al., in *J. Electrochem. Soc.* 149, E166 (2002), have shown that the distance $L_{gap}$ must be greater than three times the membrane layer thickness $l_m$. At this distance, the inhomogeneities that are regularly caused by the edge of a working electrode, and the losses of potential resulting from the hydrogen oxidation reaction (HOR), are negligible, and the potential measured at the reference electrode regularly corresponds to the membrane potential at any arbitrary point along the z-axis between the anode and the cathode in the working area.

The measurements of the membrane potential $\Phi$ and of the electrode potentials then allow the overvoltages at the anode and the cathode to be separated.

Furthermore, with the aid of reference electrodes it is possible to carry out electrochemical impedance spectroscopy between the reference electrode and any other cell electrode. This technique has already been applied in the field of solid oxide fuel cells (SOFC).

In electrochemical cells, in which protons act as charge carriers, the potential of a hydrogen-fed reference electrode generally corresponds to the membrane potential $\Phi$ at the location of the reference electrode, neglecting the voltage losses due to the hydrogen oxidation/generation reaction.

In the implementation for positioning a reference electrode in a fuel cell according to FIG. 1, however, two essential problems occur. Unless indicated otherwise, it is assumed hereafter that the anode is grounded, and that all potentials are measured with respect to the anode.

Initially, it shall be noted that even a very small shift ($\delta$) in the alignment of the edges of the working electrodes with respect to the counter electrode nonetheless causes a large change in the potential at the reference electrode. This effect has already been sufficiently discussed in the literature on solid oxide fuel cells (SOFCs). Several suggestions on minimizing this effect have also already been described there. An analogous application of this solution to PEMFCs has likewise already been proposed in the literature, which reports on a system of working electrodes precisely aligned by way of laser ablation.

A further problem, which occurs even in electrochemical cells in which the edges of the working electrodes are precisely aligned ($\delta$=0), is that, even though the value of the potential $\Phi$ measured by the reference electrode corresponds to a point on the z-axis between the working electrodes, the exact position of this point on the z-axis is not known. It is therefore not possible, in such a case, to unambiguously evaluate and interpret the measured DC voltage signal of the reference electrode. In this case as well, the separation of the half-cell overvoltages can only take place by way of impedance spectroscopy.

Figure 2:
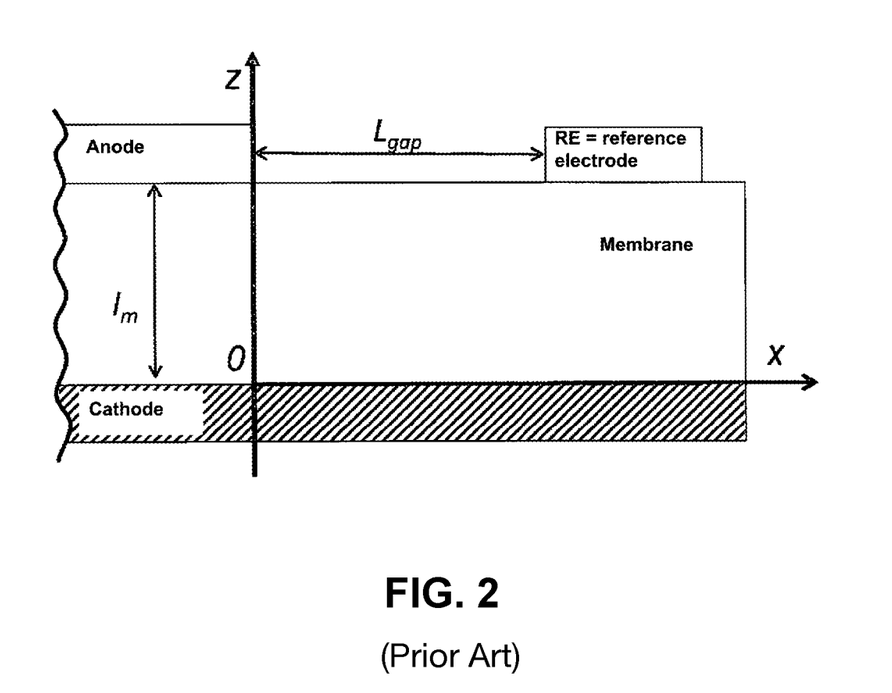
FIG. 2 shows an exemplary schematic fuel cell arrangement comprising a reference electrode (from the prior art)

The latest developments by A. A. Kulikovsky and P. Berg (DE 102015001572.9), however, demonstrate that it is possible to determine the overvoltage of a working electrode in a fuel cell by measuring the potential of a reference electrode compared to the grounded counter electrode. A fuel cell according to FIG. 2 is used for this purpose. This includes a large-surface-area (endless) working electrode, which in this instance is a cathode, and a counter electrode, which has at least one lateral edge. Within the scope of the invention, an electrode is referred to as having a large surface area (being endless) when the extension thereof corresponds at least to 10 times the parameter $l_*$, and in particular when the extension of the electrode is greater than the membrane layer thickness by several orders of magnitude. As a result of the edge of the counter electrode, an electrode-free region is obtained, compared to the working electrode, on the electrolyte membrane surface adjoining the counter electrode, in which the reference electrode is disposed on the electrolyte membrane surface. Due to the fact that the working electrode no longer has an edge in the vicinity of the working area, there is likewise no longer a problem of the alignment of the electrode edges.

It was possible to demonstrate that the minimum distance $L_{gap}$ between the reference electrode and the edge of the counter electrode must meet the following condition:

$$L_{gap} \geq 3 \cdot l_* = 3 \cdot \sqrt{\frac{\sigma_m b_{ox} l_m}{2 j_{ox}^{+0}}},$$

where $\sigma_m$=ionic conductivity of the electrolyte membrane ($\Omega^{-1}$ cm$^{-1}$), $b_{ox}$=Tafel slope of the half cell for the electrochemical reaction of the cathode, $l_m$=membrane layer thickness (cm) and $j_{ox}^0$=exchange current density of the catalyst of the cathode per unit of electrode surface in (A cm$^{-2}$). At distances between the reference electrode and the counter electrode which correspond at least to this minimum distance, it can be ensured that the measurement of the potential of the reference electrode substantially corresponds to the overvoltage of the working electrode, which is to say the cathode.

Using typical cell parameters (see Table 1), this yields a minimum distance $L_{gap}$ on an order of magnitude of several centimeters, in the case of the reference electrode being disposed on the anode side for ascertainment of the overvoltage on the cathode side. This distance, however, is a very large value for a test fuel cell of normally 10 cm*10 cm or smaller.

SUMMARY OF THE INVENTION

It is an object of the invention to provide a method for ascertaining the overvoltage of a working electrode of a fuel cell which overcomes the existing disadvantages of the prior art and, in particular, the aforementioned minimum distance from the reference electrode in a fuel cell arrangement. The method should, in particular, be usable for polymer electrolyte membrane fuel cells (PEMFC), direct methanol fuel cells (DMFC) and high-temperature solid oxide fuel cells (SOFC).

It is furthermore an object of the invention to provide an improved fuel cell arrangement, with the aid of which the aforementioned method according to the invention can be carried out.

The objects of the invention are achieved by a novel fuel cell arrangement according to the main claim and by a method according to the additional independent claim. Advantageous embodiments of the device and of the method can be found in the respective dependent claims.

Within the scope of the present invention, it was found, supported by numerical simulations for a polymer electrolyte membrane fuel cell (PEMFC) comprising a concentric small anode and a concentric large-surface-area (endless) cathode, that a novel arrangement overcomes the existing disadvantages of the prior art, based on, and in a continuation of, the arrangement of a reference electrode in a fuel cell as proposed in A. A. Kulikovsky and P. Berg (DE 102015001572.9). For this purpose, a fuel cell arrangement is proposed, in which it is possible to position a reference electrode at a considerably smaller distance than before from a counter electrode, and in particular an anode, and it is nonetheless possible to ascertain the overvoltage of the counter electrode, and in particular of a cathode, with sufficient accuracy. Moreover, this novel arrangement of the fuel cell regularly has electrode surface areas that are able to ensure sufficient electrochemical conversion.

A model was developed for a radial distribution of the cathode overvoltage $\eta_c$ and of the membrane potential $\Phi$ in the anode-free region of the fuel cell. Mathematically, the problem results in an axially symmetric Poisson-Boltzmann equation for the cathode overvoltage $\eta_c$. The solution to this problem demonstrates that $|\eta_c|$ shows a rapid drop to zero as a function of the radius, while $|\Phi|$ quickly rises to the value of $|\eta_c^0|$ of the cathode overvoltage in the working area of the cell. The smaller the radius of the concentric anode $R_a$, the faster the membrane potential $\Phi$ reaches the value of the cathode overvoltage in the working area $\eta_c^0$.

From this, it follows that, in measuring the cathodic overvoltage between the (working) electrodes, the smaller the local radius $R_a$ of this region, the closer the reference cell (RE) can be positioned to the convexly curved edge region of the curved anode.

Hereafter, the electrode of the fuel cell on which the overvoltage is to be ascertained is referred to as the working electrode. In contrast, a counter electrode shall be understood to mean a further electrode of this fuel cell, which is required for the necessary conduction of current. Both the working electrode and the counter electrode are electrodes at which electrochemical processes take place in a controller manner.

In the literature, model notions of the fuel cells comprising a reference electrode are based on the 2D simulations in which the membrane potential $\Phi$ is present in the plane perpendicular to the working electrodes and the reference electrode (x-z plane in FIG. 1). The numerical calculations, however, show neither a dependence nor a characteristic quantification during variations, for the membrane potential $\Phi$ in such systems.

The invention now achieves the object of being able to measure a meaningful overvoltage in a fuel cell by way of a reference electrode, by proposing a fuel cell arrangement comprising an electrolyte membrane, which comprises a counter electrode that is delimited by at least a single edge and includes at least one convexly curved edge region having a local small radius of curvature $R_a$, and a continuous (endless) working electrode.

Within the scope of the invention, a continuous working electrode shall be understood to mean an electrode having edges disposed so far away from the working areas, which is to say from the edges of the counter electrode, that any influence on the working area by the counter electrode edges can generally be precluded. Again, the term 'continuous working electrode' shall mean that the extension thereof is greater than the parameter $l_*$ by orders of magnitude.

Adjoining the counter electrode, the fuel cell according to the invention comprises an electrode-free region on the electrolyte membrane surface. Within this region, the reference electrode is disposed at a distance $L_{gap}$ from the edge of the counter electrode. This distance is generally a multiple of the membrane thickness. The working electrode extends on the opposite side of the electrolyte membrane. This is located opposite both the counter electrode and the reference electrode, and in this regard shall be considered to be continuous. All common standard reference electrodes may be used as reference electrodes, for example a reverse hydrogen electrode (RHE), or a dynamic hydrogen electrode (DHE), in which an electrolyte potential is measured may be used.

Figure 3:
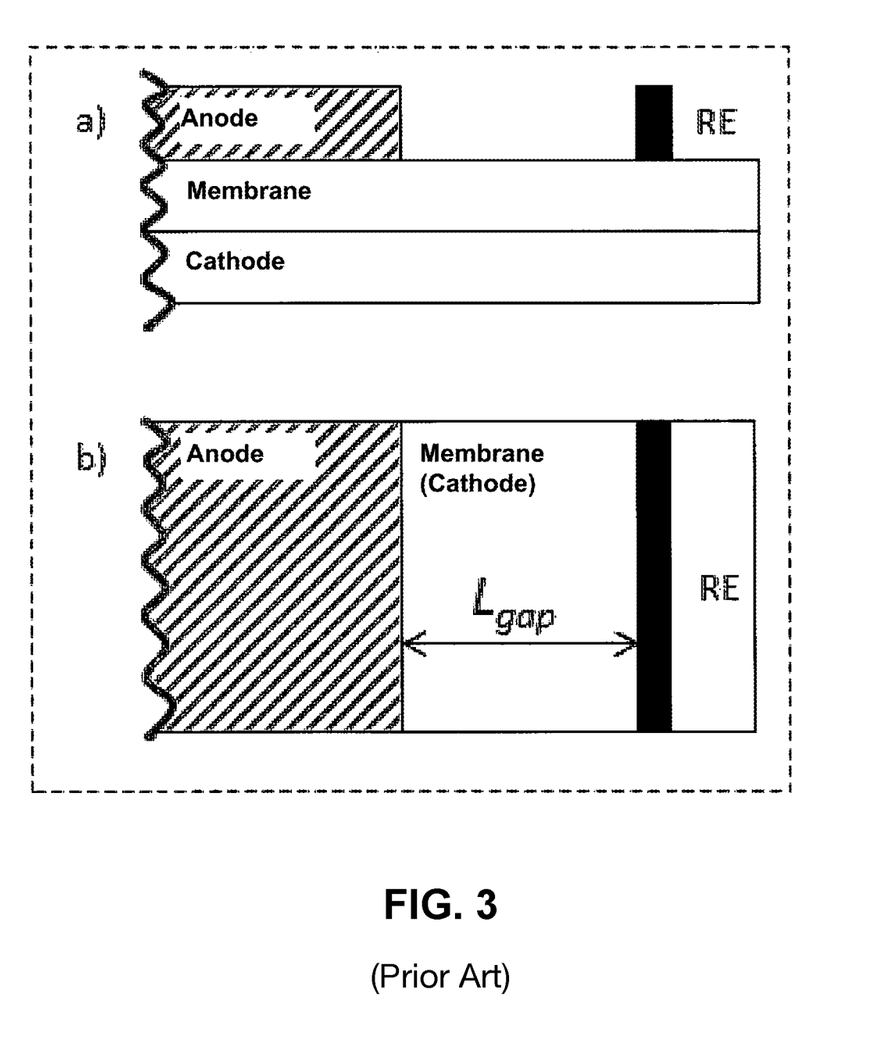
FIG. 3 shows an exemplary schematic fuel cell arrangement comprising a reference electrode (from the prior art) in a side view a) and in a top view b)

In contrast to the arrangement of A. A. Kulikovsky and P. Berg (DE 102015001572.9), which is illustrated in FIG. 3 in a cross-sectional view (a) and in a top view (b), the counter electrode in the inventive embodiment of the invention does not show only a straight edge, compared to the reference electrode, but in the top view has a convex area of curvature having a smaller radius of curvature $R_a$, at least in the edge region disposed closest to the reference electrode. This is met, in a first approximation, when the anode itself is designed in the manner of a concentric disk, as is apparent from FIG. 4.

Figure 4:
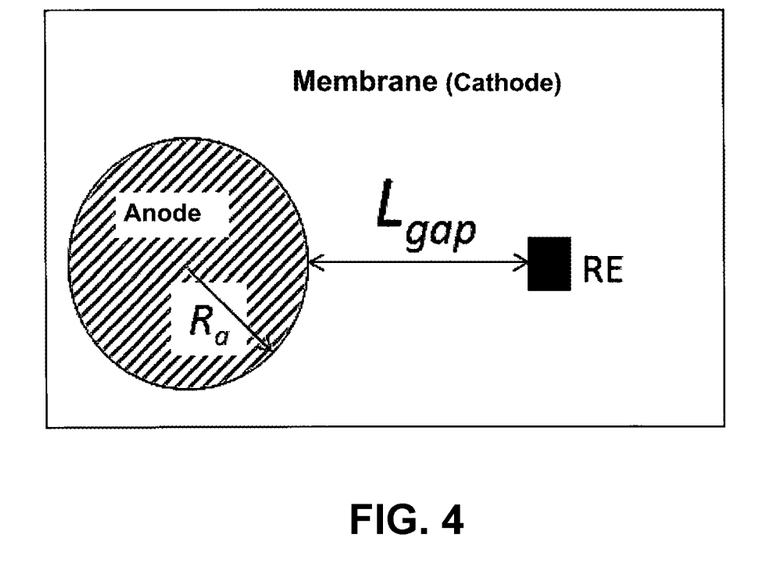
FIG. 4 shows a schematic fuel cell arrangement in a top view, comprising a concentric counter electrode.

Compared to the previously described straight edges of a counter electrode according to FIG. 3, the convexly curved region of the counter electrode having a radius of curvature $R_a$ has the advantage that the minimum distance $L_{gap}$, at which the reference electrode is disposed from the counter electrode, is considerably smaller than the corresponding distance $L_{gap}$ in the arrangement according to FIG. 4, while the overvoltage of the working electrode, and in particular of the cathode, can nonetheless be ascertained with sufficient accuracy. This is of crucial importance, in particular with small fuel cells.

The reference electrode can advantageously be designed to be very small with the arrangement according to the invention. In this way, it is possible to ensure that the tip of the convexly curved region of the counter anode is the closest region of the counter electrode. If this were not the case, the membrane potential could be impaired at the location of the reference electrode by contributions from remote regions of the anode.

In a first embodiment of the invention (FIG. 5), the counter electrode has a substantially convex edge, which includes a tip having a radius $R_a$, in the immediate vicinity of which the reference electrode is disposed at a minimum distance $L_{gap}$.

Figure 5:
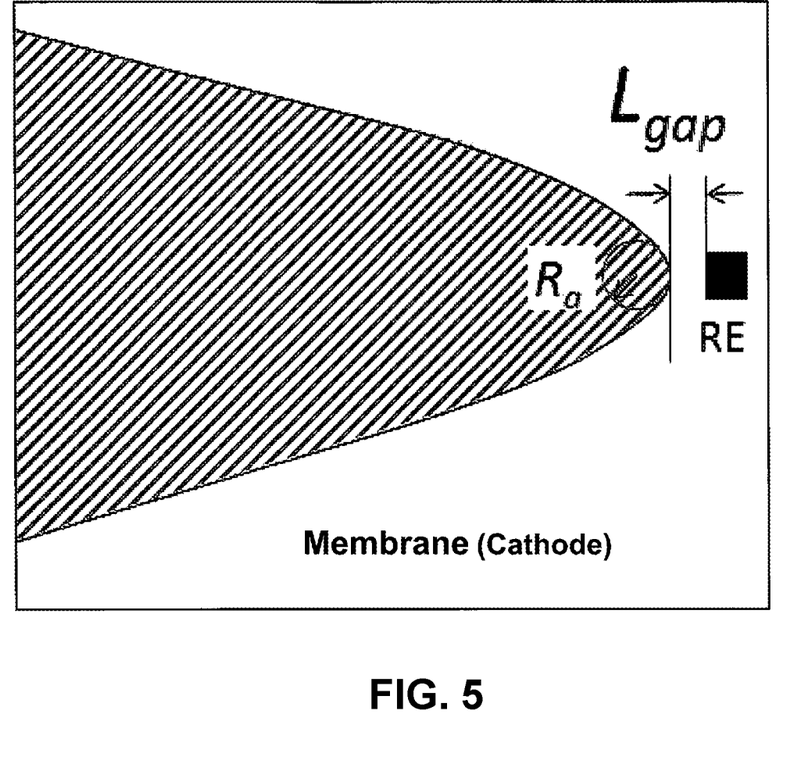
FIG. 5 shows a schematic top view onto an embodiment according to the invention of a fuel cell arrangement comprising an anode having a convexly curved edge region in close proximity to a reference electrode.

In this arrangement of the counter electrode, the distance $L_{gap}$ can be selected to be significantly smaller, which advantageously results in a much more compact design comprising the reference electrode. Nonetheless, such an arrangement advantageously makes it possible that the potential measured at the reference cell corresponds with sufficient accuracy to the overvoltage of the cathode.

During the actual measurement for ascertaining the overvoltage, the reference electrode is fed hydrogen. The counter and working electrodes are fed an operating agent and an oxidizing agent, depending on whether they are switched as an anode or cathode. During measurement, the potential of the reference electrode compared to the grounded counter electrode is measured.

A PEM fuel cell is usually operated with hydrogen and air or oxygen, a DMFC with methanol or a methanol/water mixture and air or oxygen, and a SOFC with hydrogen and air or oxygen.

In the particular in case where the counter electrode is switched as the anode and the working electrode as the cathode, the measured potential of the reference cell corresponds to the overvoltage of the cathode with sufficient accuracy.

BRIEF DESCRIPTION OF THE DRAWINGS

Additionally, several select figures are used to further illustrate the invention; however, these shall not be construed to limit the subject matter of the invention. In the drawings.

DESCRIPTION OF THE PREFERRED EMBODIMENTS

Hereafter, the fuel cell model and fundamental equations will be described, which serve as the basis for the numerical calculation for the fuel cell design according to the invention.

The following symbols are used:

~ denotes non-dimensional variables
b Tafel slope of the half cell for the anodic or cathodic reaction (V)
$E^{eq}$ equilibrium potential of a half cell (V)
F Faraday constant
J average current density in the working area (A cm$^{-2}$)
$j_a$ local proton current density on the anode side (A cm$^{-2}$)
$j_c$ local proton current density on the cathode side (A cm$^{-2}$)
$j_{hy}$ hydrogen exchange current density (A cm$^{-2}$)
$j_{hy}^0$ hydrogen exchange current density in the working area (A cm$^{-2}$)
$j_{ox}$ oxygen exchange current density (A cm$^{-2}$)
$j_{ox}^0$ oxygen exchange current density in the working area (A cm$^{-2}$)
$L_{gap}$ minimum distance between the edge of the counter electrode and the edge of the reference electrode
$L_{l,x}$ distance between the straight edge of the counter electrode and the point at which $\eta_c^+ = b_{ox}$ (cm)
$L_{l,r}$ radial distance between the edge of the counter electrode and the point at which x $\eta_c^+ = b_{ox}$ (cm)
$l_m$ membrane layer thickness (cm)
r radial position
$R_a$ anode radius
$R_c$ cathode radius
z coordinate perpendicular to the membrane surface (cm)

The following subscript indices are used:
a anode
c cathode
HOR hydrogen oxidation reaction
hy hydrogen
m membrane
ORR oxygen reduction reaction
ox oxygen
ref reference electrode
x system comprising a straight edge of the counter electrode Furthermore, the following superscript indices are used:
+ positive value
0 center of the concentric counter electrode ($\tilde{r}$)
∞ for an infinite radius Additionally, the following Greek symbols are used:
$\eta$ local overvoltage (V)
$\eta_c^{+,0}$ positive cathode overvoltage at r=0 (V)
$\sigma_m$ ionic conductivity of the membrane ($\Omega^{-1}$ cm$^{-1}$)
$\Phi$ membrane potential (V)
$\Phi^+$ positive membrane potential (V)
$\Phi^{+,\infty}$ positive membrane potential for r→∞ (V)
$\phi$ potential of the carbon phase (V)

TABLE 1

Selected physical parameters for the calculations

| | | | |
|---|---|---|---|
| ORR exchange current density | $j_{ox}^0$ | A cm$^{-2}$ | 10$^{-6}$ |
| ORR equilibrium potential | $E_{ox}^{eq}$ | V | 1.23 |
| ORR Tafel slope of the half cell | $b_{ox}$ | V | 0.03 |
| HOR exchange current density in the working area | $j_{hy}^0$ | A cm$^{-2}$ | 1.0 |
| HOR Tafel slope of the half cell | $b_{hy}$ | V | 0.015 |
| Membrane layer thickness | $l_m$ | cm | 0.005 (50 μm) |
| Proton conductivity of the membrane | $\sigma_m$ | $\Omega^{-1}$ cm$^{-1}$ | 0.1 |
| Cell potential | $\phi_c$ | V | 0.82642 |
| Average current density in the working area | J | A cm$^{-2}$ | 1 |

1. Cell Model and Basic Equations

Figure 6:
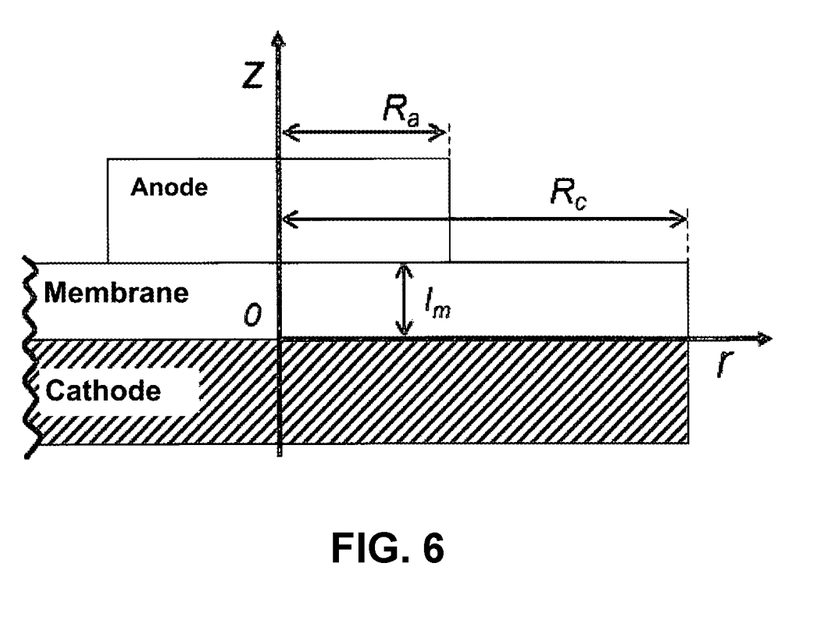
FIG. 6 shows an exemplary schematic fuel cell arrangement comprising a concentric anode having a radius $R_a$ and an (infinite) concentric cathode having a radius $R_c$ as a basis for the model calculations.

A PEMFC comprising concentric electrodes is considered, having a geometry and a coordinate system as illustrated in FIG. 6. The electrodes, which are a large-surface-area cathode and a small anode, are disposed on the two sides of the polymer electrolyte membrane having the layer thickness $l_m$. A corresponding catalyst layer, and in particular the anode catalyst layer (ACL) and the cathode catalyst layer (CCL), is generally (not shown in FIG. 7) present between the electrodes and the membrane.

The center of the concentric anode then corresponds to $r=0$, and $r=R_a$ applies for the convex edge of the anode toward the recess. In this model, the cathode can likewise be regarded as a concentric electrode having a radius $R_c$ where $R_c \to \infty$. The region $R_a < r \le R_c$ or $\infty$ is referred to as an anode-free region (recess), and the region for $0 \le r \le R_a$ as the working area. This arrangement is represented schematically in FIG. 6.

A model was developed for distribution of the cathode overvoltage $\eta_c$ and the membrane potential $\Phi$ in the anode-free region of the fuel cell. Mathematically, the problem results in the axially symmetric Poisson-Boltzmann equation for the cathode overvoltage $\eta_c$. The solution to this problem demonstrates that the anode-free region $|\eta_c|$ shows a rapid drop to zero as a function of the radius, while $|\Phi|$ quickly rises to the value of $|\eta_c|$ of the cathode overvoltage in the working area of the cell. The smaller the radius of the concentric anode $R_a$, the faster the membrane potential 1 reaches the value of the cathode overvoltage in the working area $\eta_c^0$.

From this, it follows that, for measuring the cathodic overvoltage between the working electrodes (or the working and counter electrodes), the smaller the local radius $R_a$ of this region, the closer the reference cell (RE) can be positioned to the convexly curved edge region of the anode.

The case considered here is one in which the concentric cathode having a radius $R_c$, serving as the working electrode, extends across the entire region of the membrane (endlessly), the anode however, serving as the counter electrode, makes contact with only a portion of the surface of the membrane. The center of the anode corresponds to $r=0$. The anode has a concentric geometry having the radius $R_a$, wherein $R_a < R_c$. This yields a kind of recess or anode-free region on the anode side on the surface area of the electrolyte membrane with which the anode does not make contact.

It is also, of course, analogously possible to consider the case in which the anode represents the working electrode, and a concentric cathode is present as the counter electrode.

The goal initially is to understand the distribution of current and the potentials in this system. The main variable in this problem is the membrane potential $\Phi$, which follows the Poisson equation $$\frac{1}{r}\frac{\partial}{\partial r}\left(r\frac{\partial \Phi}{\partial r}\right) + \frac{\partial^2 \Phi}{\partial z^2} = 0 \tag{1}$$

An infinitely large cathode shall mean that the cathode radius is larger than the membrane layer thickness $l_m$ by several orders of magnitude. This assumption allows the second derivative along the z-axis in equation 3 to be replaced by the difference of the proton current density into the membrane, and out of the same, resulting in the following equation:

$$\frac{1}{r}\frac{\partial}{\partial r}\left(r\frac{\partial \Phi}{\partial r}\right) = \frac{j_a - j_c}{\sigma_m l_m} \tag{2}$$

Here, $j_a$ and $j_c$ correspond to the current densities at the anode side and the cathode side of the membrane. Moreover, it is assumed that $j_a$ and $j_c$ follow Butler-Volmer kinetics.

$$j_a = 2j_{hy}\sinh\left(\frac{\eta_a}{b_{hy}}\right) \text{ and} \tag{1}$$

$$j_c = 2j_{ox}\sinh\left(-\frac{\eta_c}{b_{ox}}\right). \tag{2}$$

Here, $j_{hy}$ and $j_{ox}$ each denote the corresponding surface exchange current densities of the anode catalyst layer (ACL) and of the cathode catalyst layer (CCL), $\eta_a$ and $\eta_c$ are the corresponding local electrode overvoltages at the anode and the cathode, and $b_{hy}$ and $b_{ox}$ are the Tafel slopes of the corresponding half-cell reaction corresponding thereto. Since it is assumed that the transport losses are small, the dependence on the reactant concentration is already included in $j_{hy}$ and $j_{ox}$.

The respective half-cell overvoltages follow from $$\eta_a = \phi_a - \Phi - E_{HOR}^{eq} \tag{3}$$

$$\eta_c = \phi_c - \Phi - E_{ORR}^{eq} \tag{4}$$

wherein $\phi_a$ and $\phi_c$ represent the electrode potentials and $E_{HOR}^{eq}=0$ V and $E_{ORR}^{eq}=1.23$ V represent the equilibrium potentials of the corresponding half-cell reactions. It is assumed that the anode is grounded ($\phi_a=0$), and thus $\phi_c$ represents the cell potential.

Inserting equation (3) to equation (6) into equation (2) and introducing the non-dimensional variables $$\tilde{r} = \frac{r}{l_m}, \tilde{j} = \frac{jl_m}{\sigma_m b_{ox}}, \tilde{\Phi} = \frac{\Phi}{b_{ox}}, \tilde{\phi} = \frac{\phi}{b_{ox}}, \tilde{b}_{hy} = \frac{b_{hy}}{b_{ox}} \tag{5}$$

yields $$\frac{1}{\tilde{r}}\frac{d}{d\tilde{r}}\left(\tilde{r}\frac{d\tilde{\Phi}}{d\tilde{r}}\right) = 2\tilde{j}_{ox}^0 \sinh\left(-\tilde{\phi}_c + \tilde{\Phi} + \tilde{E}_{ORR}^{eq}\right) - 2\tilde{j}_{hy}^0 H(\tilde{R}_a - \tilde{r})\sinh\left(-\tilde{\Phi}/\tilde{b}_{hy}\right) \tag{6}$$

Here, $\tilde{j}_{ox}^0$ including the superscript symbol $^0$ corresponds to the value at the center of the concentric working electrode (cathode). H denotes the Heaviside function, which in the working area assumes the value 1, and in the anode-free region assumes the value 0. The absence of anodic catalyst outside the working area is taken into consideration by setting the exchange current density of the hydrogen oxidation reaction (HOR) to zero.

Within the scope of the invention, the distribution of the membrane potential $\Phi$ in the anode-free region is now examined. In this region, the current production at the anode side vanishes, and equation (8) is simplified to $$\frac{1}{\tilde{r}}\frac{d}{d\tilde{r}}\left(\tilde{r}\frac{d\tilde{\Phi}}{d\tilde{r}}\right) = 2\tilde{j}_{ox}^0 \sinh\left(-\tilde{\phi}_c + \tilde{\Phi} + \tilde{E}_{ORR}^{eq}\right) \tag{9}$$

It is now possible to represent this equation as a function of the cathode overvoltage according to equation (6). As a non-dimensional equation, this results in $$\tilde{\eta}_c = \tilde{\phi}_c - \tilde{\Phi} - \tilde{E}_{ORR}^{eq} \tag{10}$$

Inserting this into equation (9) yields $$\frac{1}{\tilde{r}}\frac{d}{d\tilde{r}}\left(\tilde{r}\frac{d\tilde{\eta}_c}{d\tilde{r}}\right) = k^2 \sinh \tilde{\eta}_c \quad (11)$$

where $k = \sqrt{2\tilde{j}_{ax}^0}$ \quad (12)

By introducing the positive overvoltage, $$\tilde{\eta}_c^+ = -\tilde{\eta}_c > 0 \quad (13)$$

the following equation is obtained for $$\frac{1}{\tilde{r}}\frac{d}{d\tilde{r}}\left(\tilde{r}\frac{d\tilde{\eta}_c^+}{d\tilde{r}}\right) = k^2 \sinh \tilde{\eta}_c^+ \quad (14)$$

2. General Conditions

It was possible to demonstrate that, due to the very high exchange current density of the hydrogen oxidation reaction (HOR), the cathode potential $\tilde{\eta}_c$ at the anode edge in polymer electrolyte fuel cells is very close to the bulk potential value in the working area according to equation 7. For a system having axial symmetry, it is therefore to be expected that $\tilde{\eta}_c^+(\tilde{R}_a) \cong \eta_c^{+,0}$, wherein $\eta_c^{+,0} \cong \tilde{\eta}_c^+(0) = -\tilde{\eta}_c(0)$ is the overvoltage of the oxygen reduction reaction (ORR) at the center of the axis of symmetry. Numerical tests confirmed this assumption. As a result, however, the working area can advantageously be eliminated from the consideration by placing the potential $\tilde{\eta}_c^+(\tilde{R}_a) = \tilde{\eta}_c^{+,0}$ at the edge of the anode. In this way, the general conditions for equation 14 result as follows:

$$\tilde{\eta}_c^+(\tilde{R}_a) = \tilde{\eta}_c^{+,0}, \left.\frac{d\tilde{\eta}_c^+}{d\tilde{r}}\right|_{\tilde{r}=\infty} = 0 \quad (15)$$

The second equation means that the proton current density along $\tilde{r}$ moves toward zero for $\infty$. The fact of an infinite cathode exists approximately when the following condition is met: $\kappa \tilde{R}_c \gg 1$. The condition, however, is redundant. A more detailed analysis shows that the approximation works well with an infinite cathode as long as $$R_c \gtrsim 3L_{l,r} \quad (16)$$

wherein $L_{l,r}$ is given by equation 18. Such a condition can be regularly regarded as given for fuel cells on a laboratory scale.

3. Different Anodic Radii $R_a$

Figure 7:
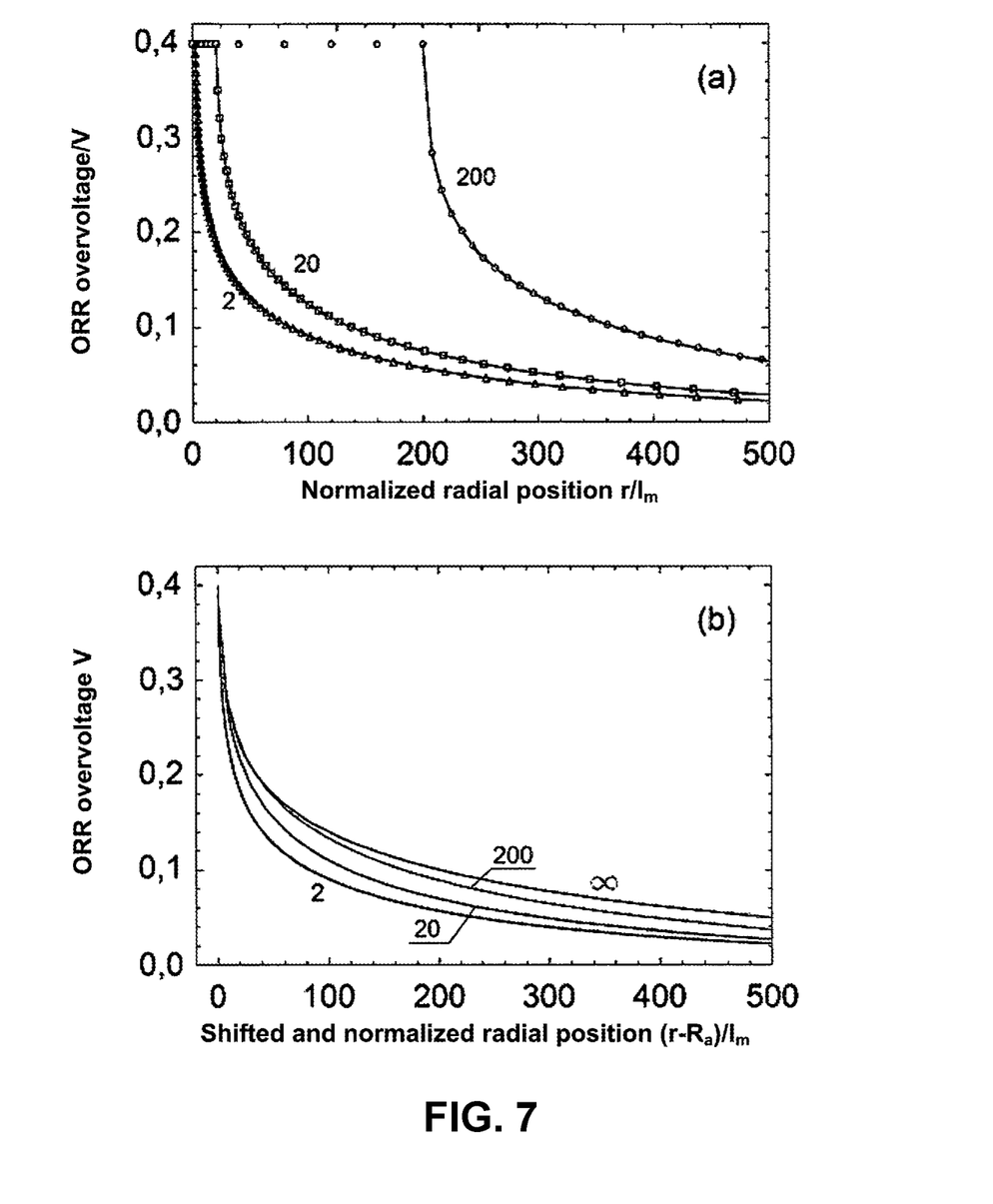
FIG. 7 shows the curve of the potential of the oxygen reduction reaction as a function of the radial position, standardized for the membrane layer thickness $l_m$ for the indicated standardized anode radius $R_a/l_m$ according to the model from FIG. 7.

FIG. 7 shows the solutions for equation 14 for different anode radii $R_a$. The particular characteristic of this problem is that the gradient of the potential of the oxygen reduction reaction (ORR) $\eta_c^+$ increases very close to the anode edge as the anode radius decreases. Qualitatively, this resembles the behavior of Laplace's potential between a charged metal tip and a plane: the narrower the radius of the metallic tip, the more strongly the potential drops in the vicinity of the tip as a function of the axial symmetry.

The practical significance that can be derived from FIG. 7 is that, in a fuel cell arrangement comprising a large-surface-area cathode and a concentric anode, the smaller the radius of the anode, the closer the reference electrode (RE) can be disposed to the anode. This applies under the prerequisite that this arrangement is to be used, and can be used, to ascertain the cathodic overvoltage with sufficient accuracy.

4. Position of the Reference Electrode

Figure 8:
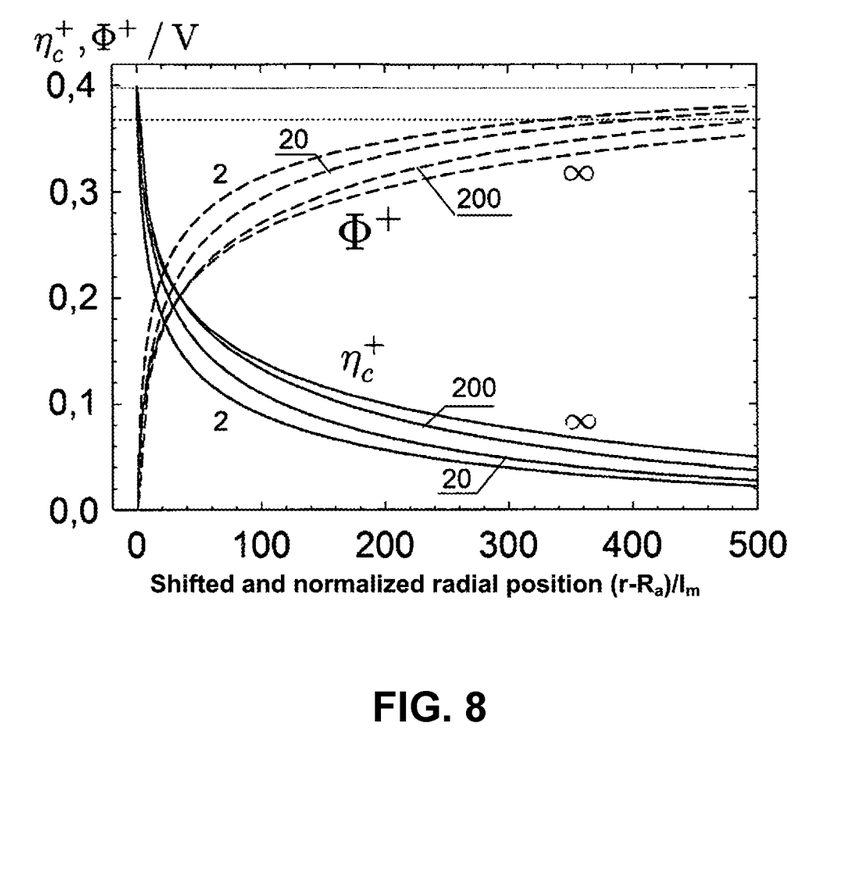
FIG. 8 shows the membrane potential $\Phi^+$ and the local overvoltage on the cathode side $\eta_c^+$ in the region around the anode edge, in each case plotted against the standardized radial distance from the edge of the anode (concavely curved edge region), based on the example of a PEMFC.

It becomes apparent from FIG. 8 that the positive membrane potential $\Phi^+$ approaches the limiting value $\eta_c^{+,0}$ more quickly as the anode radius $R_a$ decreases. Likewise, the radial width of the region $\tilde{L}_{l,r}$ dominated by the oxygen reduction reaction is apparent from FIG. 8. This radial width increases with the increasing anode radius $R_a$.

Figure 9:
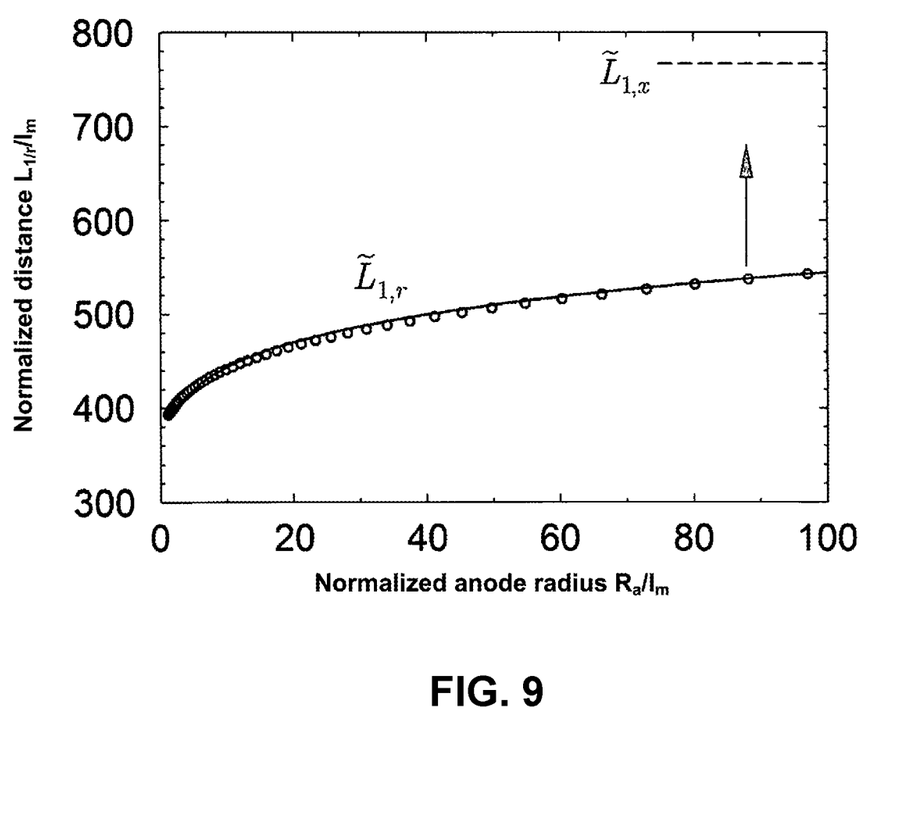
FIG. 9 shows the normalized distance from the anode edge to the point at which the overvoltages of the oxygen reduction reaction drop to the value of the ORR Tafel slope $b_{ox}$ as a function of the standardized anode radius.

For further estimations, the assumption is made that the reference electrode (RE) is disposed at a distance $\tilde{L}_{l,r}$ from the at least partially convexly curved anode edge having the local radius $R_a$. FIG. 8 shows that this assumption results in the determination of $\eta_c^+$ with a 10% accuracy. It is advisable to compare this distance $\tilde{L}_{l,r}$ (FIG. 9, solid line) to the analogous $\tilde{L}_{l,x}$ distance for a straight anode edge according to FIG. 3. The dotted line in FIG. 9 represents the value of $\tilde{L}_{l,s}$. Physically, $\tilde{L}_{l,r}$ is an asymptote, approached by the $\tilde{L}_{l,x}$ curve for $\tilde{R}_a \to \infty$ (FIG. 9). For very small radii of the anode, which is to say for $\tilde{R}_a \leq 10$, the radial distance $\tilde{L}_{l,r}$ between the curved anode edge and the reference electrode is only half as small as the distance $$\tilde{L}_{l,x} \cong \frac{1,4}{\kappa}$$

for the corresponding anode geometry having a straight edge, as shown in FIG. 4. But even at larger radii, for example for $\tilde{R}_a \approx 100$ (right edge in FIG. 9), the radial distance $\tilde{L}_{l,r}$ between the curved anode edge and the reference electrode is still almost 30% smaller than the distance $\tilde{L}_{l,x}$ that would result for the corresponding anode geometry having a straight edge.

It must be noted that the distance $\tilde{L}_{l,r}$ decreases drastically for very small anode radii. For the range of $\tilde{R}_0 \leq 1$, it is questionable whether the underlying model can still be applied, since possible strong two-dimensional effects in close proximity to the concavely curved anode edge are ignored. Thus, for the optimal minimum distance, $\tilde{R}_a$ would advantageously be selected in the range of 2 to 3.

A possible expression that describes the dependencies of $\tilde{L}_{l,r}$ as a function of $\tilde{R}_a$ in the region of $0 \leq \kappa \tilde{R}_a \leq 1$ is given by $$\tilde{L}_{l,r} \cong \frac{\pi}{2\kappa}\left[\ln\left\{\frac{67}{18(\kappa \tilde{R}_a)^{7/45}}\right\}\right]^{-1} \text{ for } 0 \leq \kappa \tilde{R}_a \leq 1 \quad (17)$$

and is represented in FIG. 9 by open circles. In the non-dimensional case, this yields the following equation:

$$L_{l,r} \cong \frac{\pi \lambda_D}{2}\left[\ln\left(\frac{67}{18(R_a/\lambda_D)^{7/45}}\right)\right]^{-1}, \text{ where } \lambda_D = \sqrt{\frac{\sigma_m b_{ax} l_m}{2 j_{ax}^0}} \quad (18)$$

This equation 18 can advantageously be used to estimate the required minimum distance $L_{gap}$ between the anode tip (convexly curved edge region) having the local radius $R_a$ and the reference electrode in an application in terms of development. If a certain the measurement accuracy is required, should $L_{gap} \cong 3 \cdot L_{l,r}$ be used as the minimum distance.

FIGS. 4 and 5 show possible arrangements for a fuel cell, each comprising a reference electrode. FIG. 3 shows the arrangement of a reference cell in a fuel cell having a straight anode edge according to the prior art. In this case, the minimum distance results as $$L_{gap} \cong 3 \cdot \lambda_D, \text{ where } \lambda_D = \sqrt{\frac{\sigma_m b_{ax} l_m}{2 j_{ax}^0}},$$  5

FIG. 5, in contrast, shows the case for an embodiment of the arrangement according to the invention in which the anode comprises a convexly curved edge region in close proximity to the reference electrode. Here, $L_{gap} \cong 3 \cdot L_{l,r}$ applies for the minimum distance, wherein $L_{l,r}$ is given by equation 18. It should be noted that $L_{gap}$ is smaller in FIG. 5 than in FIG. 3. FIG. 5 shows a fuel cell arrangement comprising an anode edge having a convexly curved tip. This tip causes the membrane potential $\Phi^+$ to increase drastically and quickly as the distance away from the tip increases. In this case, the reference electrode can thus be disposed very close to the tip, without interfering with the accuracy of the measurement. The value of the distance $L_{gap}$ in FIG. 5 can be easily determined by equation 18 by using the local radius of the anode tip for $R_a$.

Using the parameters from Table 1 and an anode radius $R_a = 0.01$ cm, a distance $L_{l,r} = 1.97$ cm would be obtained from equation 18. For an arrangement comprising an appropriately straight anode edge, the same membrane potential would not be achieved until a distance of $L_{l,x} = 3.83$ cm. At smaller anode radii $R_a$, the advantage would be even greater, due to the curved anode edge.

The invention claimed is:

1. A fuel cell, comprising:
   a polymer electrolyte membrane having a layer thickness $l_m$;
   a working electrode that is a continuous electrode and is disposed on one side of the polymer electrolyte membrane; and
   a counter electrode which is grounded and is disposed on the other side of the polymer electrolyte membrane; and
   wherein the counter electrode has an outer edge spanning an entire circumference of the counter electrode along a surface of the polymer electrolyte membrane, said outer edge comprising a first portion forming a lateral edge having a convex curvature with a local radius $R_a$ and said outer edge comprising a second portion with a local radius greater than $R_a$, so that said lateral edge forms a convexly curved tip which is more convexly curved than said second portion;
   wherein the polymer electrolyte membrane surface comprises an electrode-free region adjoining the counter electrode and opposite the working electrode;
   wherein a reference electrode is disposed on the polymer electrolyte membrane surface in a region of the electrode-free region and in an immediate vicinity of a region of the convexly curved tip of the counter electrode;
   wherein the minimum distance $L_{gap}$ between the reference electrode and the convexly curved tip of the counter electrode is given by $$L_{gap} = 3 \cdot L_{l,r} \text{ where}$$

$$L_{l,r} = \frac{\pi \lambda_D}{2} \left[ \ln\left(\frac{67}{18(R_a/\lambda_D)^{7/45}}\right) \right]^{-1} \text{ and}$$

$$\lambda_D \sqrt{\frac{\sigma_m b_{ax} l_m}{2 j_{ax}^0}}$$

where
$\sigma_m$ = ionic conductivity of the polymer electrolyte membrane ($\Omega^{-1}$ cm$^{-1}$),
$b_{ox}$ = Tafel slope of the half cell for the electrochemical reaction of the working electrode (V),
$l_m$ = polymer electrolyte membrane layer thickness (cm),
$j_{ox}^0$ = exchange current density of the catalyst of the working electrode per unit of electrode surface in (A cm$^{-2}$), and
$R_a$ = local radius of the convexly curved tip of the counter electrode (cm) located closest to the reference electrode; and
wherein the reference electrode is disposed at a distance in the range of $L_{gap}$ to 100 $L_{gap}$ from the convexly curved tip of the counter electrode.

2. The fuel cell according to claim 1, comprising a cathode as the working electrode, and an anode as the counter electrode.

3. The fuel cell according to claim 1, wherein the convexly curved tip has a local radius $R_a$ between 0.01 and 1 cm.

4. The fuel cell according to claim 1, wherein the convexly curved tip has a local radius $R_a$ of less than 0.1 cm.

5. The fuel cell according to claim 1, wherein the working electrode extends for a distance that is greater than $3\lambda_D$.

6. The fuel cell according to claim 1 for carrying out a method for ascertaining the overvoltage of the working electrode in the fuel cell, comprising measuring a potential of the reference electrode and a potential of the grounded counter electrode; and comparing the potential of the reference electrode to the grounded counter electrode.

7. The fuel cell according to claim 1, wherein the reference electrode is disposed at a distance in the range between $L_{gap}$ and 10 $L_{gap}$.

8. The fuel cell according to claim 1, wherein the reference electrode is disposed at a distance in the range between $L_{gap}$ and 3 $L_{gap}$.

* * * * *